(No Model.) 2 Sheets—Sheet 2.

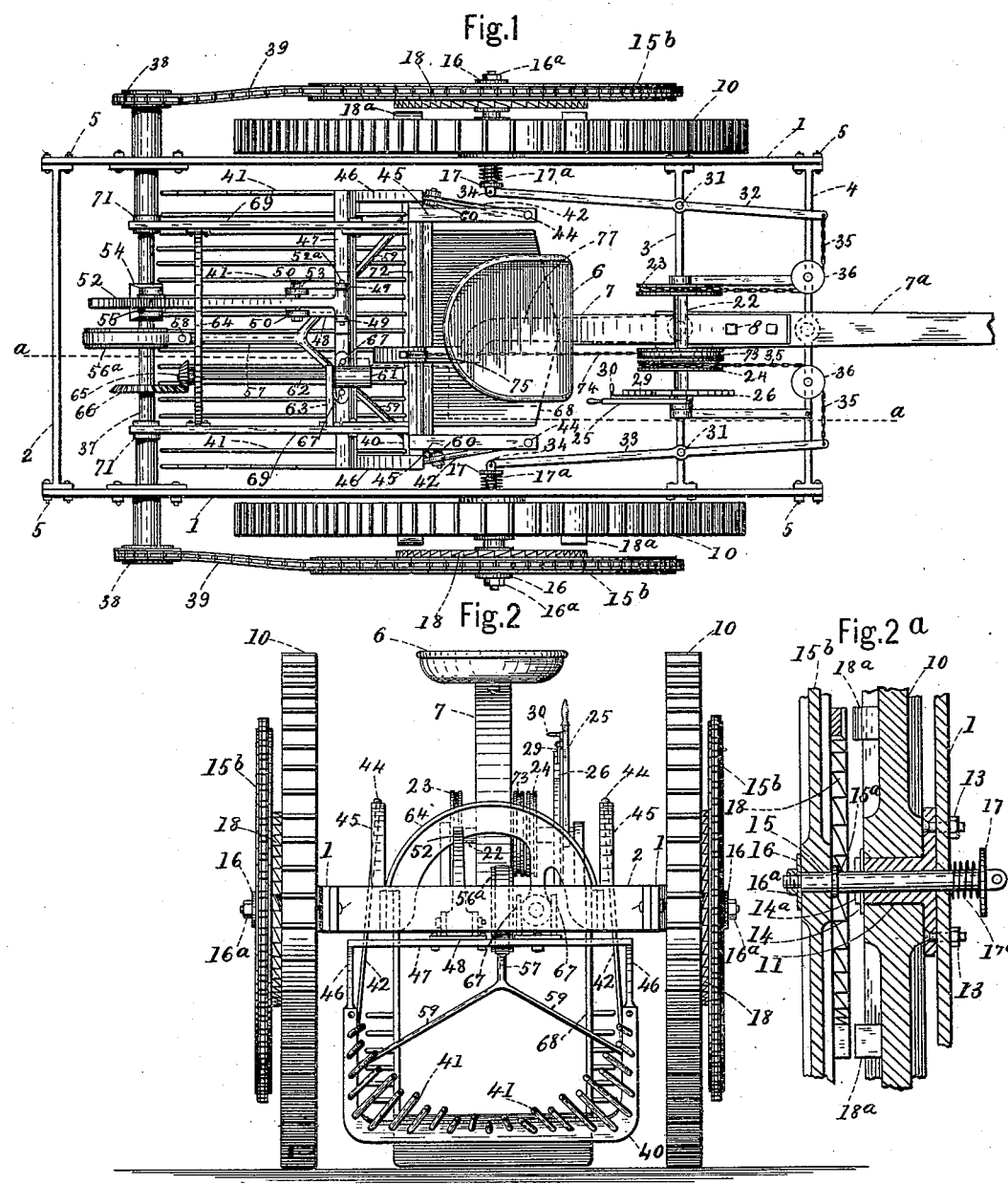

W. & J. REUTHER.
POTATO DIGGER.

No. 473,084. Patented Apr. 19, 1892.

Witnesses,
Harriet Johnson
August Fey

Inventors
William Reuther
John Reuther
By James Sangster
Attorney.

UNITED STATES PATENT OFFICE.

WILLIAM REUTHER AND JOHN REUTHER, OF ELMA, NEW YORK.

POTATO-DIGGER.

SPECIFICATION forming part of Letters Patent No. 473,084, dated April 19, 1892.

Application filed December 23, 1891. Serial No. 415,998. (No model.)

*To all whom it may concern:*

Be it known that we, WILLIAM REUTHER and JOHN REUTHER, citizens of the United States, residing in Elma, in the county of Erie and State of New York, have invented certain new and useful Improvements in Potato-Diggers, of which the following is a specification.

Our invention relates to certain improvements in potato-diggers, whereby the shaking screen is rendered more efficient in its action, and also to certain details of construction, all of which will be fully and clearly hereinafter described and claimed, reference being had to the accompanying drawings, in which—

Figure 3:
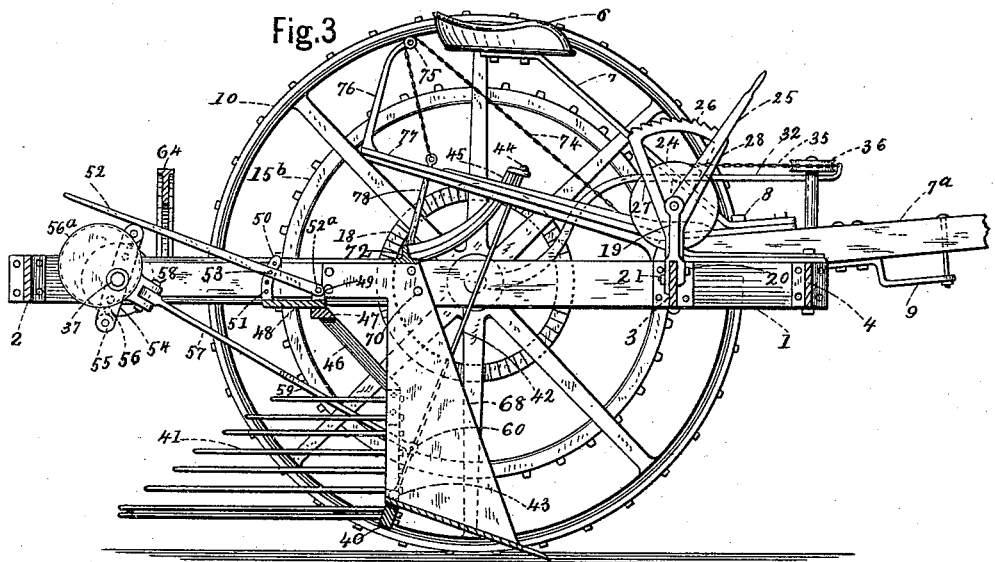
Figure 4:
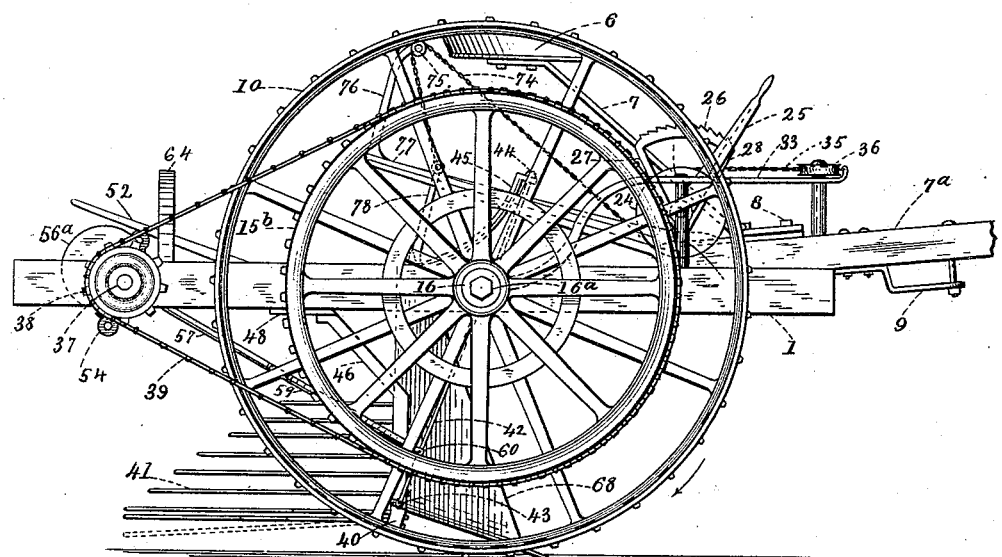

Figure 1 is a plan view of the machine complete. Fig. 2 is a rear end view of the same, a portion of the device for giving the vertical shaking movement and some minor parts being omitted. Fig. 2ª is a sectional elevation showing a section through a portion of one of the large sprocket-wheels, also through a portion of one of the driving-wheels, its bearing, and a portion of one of the side frames for illustrating the operation of this part of the machine. Fig. 3 is a sectional elevation on or about line *a a*, Fig. 1, some portions being omitted to prevent confusion. Fig. 4 is a side elevation of the machine complete.

Referring to the drawings, 1 represents the side frame-pieces of the machine. They are constructed, preferably, of iron secured together by cross-bars 2, 3, and 4, rigidly fastened by bolts 5. The seat 6 is made in the usual way and secured upon a spring 7, which is bolted to the pole 7ª by bolts 8. At the lower side of the pole is secured by bolts the usual clevis 9. The driving-wheels 10 are mounted on hubs 11, which are secured to the side frame-pieces 1 by the bolts 13. (See Fig. 2ª, where this construction is shown on an enlarged scale.) They are kept in place on the hubs by washers 14 and pins 14ª. The sprocket-wheels 15ᵇ are mounted on journals 15, which pass through the hubs 11 and through the side frame-pieces 1 and are kept in place by collars 15ª (see Fig. 2ª) and washers 16 and nuts 16ª. The opposite ends of journals 15 project out through the inside of the side frame-pieces 1 and are each provided with a collar 17, (see Fig. 2ª,) having a spiral spring 17ª, the tendency of which is to keep the sprocket-wheels close to the driving-wheels when free to act. On the inner side of each sprocket-wheel 15ᵇ is a ring rigidly secured to or forming a portion of the sprocket-wheel, having a series of ratchet-teeth 18, and on the driving-wheels is a series of projecting teeth 18ª, so that when the springs 17ª are free to act they will draw the sprocket-wheel teeth 18 into engagement with the teeth 18ª on the driving-wheels and cause the sprocket-wheels to turn with them when the machine is operating.

The mechanism by which the sprocket-wheels 15ᵇ are connected with or disconnected from the main driving-wheels is as follows: At the front portion of the machine are two upright standards 19, which are rigidly secured to the transverse frame-bar 3 by bolts 20 and 21. (See Fig. 3, where this is shown.) In bearings in these standards is mounted a shaft 22, upon which are rigidly secured two grooved wheels 23 24, (see Figs. 1 and 2, also Figs. 3 and 4,) and near one end of the shaft is rigidly secured an arm 25, and at one side of the arm 25 is a curved rack-bar 26, having its lower frame or supporting portions 27 28 firmly secured to the cross-frame bar 3. On one side of the arm 25 is a small sliding pawl-bar 29 (shown in Figs. 1 and 2) of any well-known construction for holding the arm at any point to which it may be moved. This sliding pawl-bar is provided with a handle 30, by which it may be operated. To the cross-frame bar 3 are rigidly secured two vertical standards 31, (shown in the plan view, Fig. 1, and the side elevation, Fig. 4, the near standard 31 and its arm 33 being omitted in Fig. 3,) to the top of which are pivoted two arms 32 and 33, having their rear ends pivoted to the journal-pins 15 by pins 34, (see Fig. 1,) and to each of their opposite ends is secured a chain 35, which passes along and around the grooved friction-rollers 36, and from thence to the grooved wheels 23 and 24. (See Fig. 1, also Fig. 4.)

From the above construction it will be seen that by drawing the arm 25 backward, as in Fig. 1, it will turn the wheels 23 and 24 in the same direction and draw the chains 35, so as to turn the rear ends of the arms 32 and 33 toward the sides of the machine, and thereby force the sprocket-wheels 15<sup>b</sup> out away from the driving-wheels 10 and out of engagement with them, as shown in Fig. 1. When the arms 25 are moved in the opposite direction, the springs 17<sup>a</sup> are allowed to act and draw the sprocket-wheels back into engagement with the driving-wheels 10 again, as hereinbefore mentioned.

Near the rear end of the machine-frame is mounted in bearings in the frame a driving-shaft 37, on each outer ends of which is rigidly secured a sprocket-pinion 38. (See Figs. 1 and 4.) These sprocket-pinions are connected with the large sprocket-wheels 15<sup>b</sup> by the sprocket-chains 39. (Shown in Figs. 1 and 4.)

The construction of the screen is as follows: The screen-frame 40 is made, preferably, of iron and is of a U-shaped form, substantially as shown in Figs. 1 and 2, particularly in Fig. 2. It is also shown in Figs. 3 and 4, and is provided with a series of screen-bars 41, which are rigidly secured to the U-shaped bar by being passed through perforations and riveted fast. This screen is suspended at the rear by means of the side arms 42, one being connected at each side of the screen by ball-joints 43 at the lower ends of said arms, and their upper ends are connected by ball-joints 44 to brackets 45. The screen is further supported by the two side frame-bars 46, which are rigidly connected with it and with a cross-bar 47 at the top. To the cross-bar 47 is rigidly secured a horizontal plate 48, the plate being shown in section in Fig. 3, having at one end two upwardly-projecting ears 49, (see Figs. 1, 2, and 3,) and at the opposite end two upwardly-projecting ears 50, having a series of perforations 51. Between the ears 49 is pivoted an arm 52 by a pin 52<sup>a</sup>. (See Figs. 1 and 3.) The arm 52 is adjusted up or down between the ears 50 and held rigidly at any point to which it may be adjusted by the pin 53. On the driving-shaft 37 is a bar 54, mounted centrally thereon, as shown in Figs. 1, 3, and 4. At each end of this bar 54 is a friction-roller 55. (Shown more clearly in Fig. 1.) This bar 54 is provided with a series of perforations 56, so that the friction-rollers can be adjusted to different points on the bar 54. The arm 52 rests on the friction-rollers and is given an up-and-down swinging motion as the shaft 37 rotates and imparts a similar reciprocating or shaking movement to the rear or ends of the screen-bars.

To give the screen a longitudinal movement, we employ an eccentric 56<sup>a</sup>, rigidly secured to the shaft 37. A forked connecting-rod 57 is pivoted to the eccentric by a pin 58 (see Figs. 1 and 3) and the forked ends 59, pivoted one to each supporting-bar 42 at or about the points 60. (See Figs. 1, 3, and 4.) This construction gives to the screen a longitudinal motion back and forth. The screen is given a side shaking movement by means of an eccentric 61, mounted on a horizontal shaft 62. (Shown in Fig. 1.) This shaft 62 is supported in a bearing in the projecting bracket 63. (Shown in Fig. 1.) At its other end it is set in a bearing in the arched cross-brace 64, and is provided with a bevel-pinion 65, which gears in with the bevel-wheel 66, rigidly secured to the driving-shaft 37. The eccentric 61 is located between two vertical pins 67. (See Fig. 1, also Fig. 2, where these vertical pins 67 are shown in dotted lines.) From this construction it will be seen that as the eccentric 61 turns it will give the screen a side shaking movement, which movement is transmitted through the bevel-gearing from the driving-shaft.

The shovel 68 is attached to an independent frame 69 by bolts 70. (See Fig. 3.) The driving-shaft 37 passes through the rear ends of the frame 69 (see Fig. 1) at the point 71, as shown in said Fig. 1, so that the frame 69 swings at that point on the driving-shaft. On the top of this frame 69 is a ribbed cross-bar 72, (shown in Figs. 1 and 3,) rigidly secured to it in any well-known way, and to the bar 72 are rigidly secured the supporting-brackets 45, so that when the shovel is raised or lowered the screen moves with it.

The shovel is raised and lowered by means of a grooved wheel 73, (see Figs. 1 and 2,) which is rigidly secured to the shaft 22 and is connected by a chain 74 with the shovel. This chain 74 passes from the under side of the grooved wheel 73 over a friction-roller 75 on the arm 76, which is a part of the stationary arm 77. From that it passes down and is connected with an arm 78, which is rigidly connected to the cross-bar 72. From this it will be seen that a movement of the arm 25 may be made to either raise or lower the shovel.

By the construction hereinbefore described it will be noticed that an up-and-down movement may be given to the screen by means of the arm 52 and its several connecting operating parts, and that the amount of this shaking movement may be varied by changing the position of the friction-rollers 55, and this shaking movement may be practically stopped by adjusting the friction-rollers to a point as near the shaft 37 as possible. It will be further seen that a longitudinal movement may also be given by means of the eccentric 56<sup>a</sup> and its forked connecting-rods 57 and 59, and a side movement may be given to the screen by means of the eccentric 61 and its shaft and gearing operated by the bevel-gearing 65 and 66.

The operation of the machine will be readily understood from the foregoing description and drawings, the operation of an ordinary shovel-plow in passing under the potatoes as the machine moves forward and scooping or getting the potatoes and dirt being well understood.

The object of the screen is to shake the dirt from the potatoes as much as possible.

We claim as our invention—

1. In a potato-digger, the combination, with the shaking-screen for separating the dirt from the potatoes, of two side supporting-arms secured to supports at their upper ends by universal joints and to the screen by similar joints at their lower ends, two vertical pins mounted and rigidly secured to a cross-bar connected to the screen, and an eccentric connected to a shaft mounted in bearings on the frame and connected by a bevel-pinion with a bevel gear-wheel on the driving-shaft, whereby a combined longitudinal and lateral shaking movement may be given to the screen, substantially as described.

2. In a potato-digger, the combination, with the shaking-screen for separating the dirt from the potatoes, of two side supporting-arms secured to supports at their upper ends by universal joints and to the screen by similar joints at their lower ends, an eccentric rigidly secured to a driving-shaft mounted on the main frame and secured to a forked connecting-rod having its forked ends pivoted to the supporting-arms, an agitating-bar rigidly secured centrally to the driving-shaft and provided with friction-rollers near each end, and an arm secured by pins to a cross-bar connected with the screen, so that when the arm is moved the screen moves with it, whereby a combined longitudinal and a vertical shaking movement may be given to the screen, substantially as described.

3. In a potato-digger, the combination, with the shaking-screen for separating the dirt from the potatoes, of two side supporting-arms secured to supports at their upper ends by universal joints and to the screen by similar joints at their lower ends, an agitating-bar rigidly secured centrally to the driving-shaft and provided with friction-rollers near each end, an arm secured by pins to a cross-bar connected to the screen adapted to be operated by the agitating-bar for giving the screen an up-and-down movement and two vertical pins mounted and rigidly secured to the same cross-bar, and an eccentric secured to a shaft mounted in bearings on the frame and provided with a bevel-pinion, which gears in with a bevel gear-wheel on the driving-shaft, whereby a combined lateral shaking movement and an up-and-down shaking movement may be given to the screen, substantially as described.

4. In a potato-digger, the combination, with the shaking-screen for separating the dirt from the potatoes, of two side supporting-arms secured to supports at their upper ends by universal joints and to the screen by similar joints at their lower ends, an eccentric rigidly secured to a driving-shaft mounted on the main frame and secured to a forked connecting-rod having its forked ends pivoted to the supporting-arms, an agitating-bar rigidly secured centrally to the driving-shaft and provided with friction-rollers near each end, an arm secured by a pin to a cross-bar connected with the screen, two vertical pins mounted and rigidly secured to the same cross-bar, and an eccentric secured to a shaft mounted in bearings on the frame and connected by a bevel-pinion with a bevel gear-wheel on the driving-shaft, whereby a combined longitudinal shaking movement, a side shaking movement, and a vertical shaking movement may be given to the screen, substantially as described.

5. In a potato-digger, the combination, with the shaking-screen for separating the dirt from the potatoes, of two side supporting-arms provided with ball-joints at the top and bottom, the upper joints being connected with stationary supporting-arms by which the screen is suspended and the lower ends being connected by their ball-joints with the screen, and a forked connecting-rod having its single end pivoted to an eccentric by a joint that will permit a lateral movement on the eccentric and having its forked ends pivoted to the side supporting-arms, whereby the screen is capable of being moved either up or down longitudinally or laterally, substantially as described.

6. In a potato-digger, the combination, with the shaking-screen for separating the dirt from the potatoes, of two side supporting-arms secured to supports at their upper ends by ball-joints and to the screen by ball-joints at their lower ends, and an eccentric rigidly secured to a shaft mounted on the main frame of the machine and secured to a forked connecting-rod having its forked ends pivoted to the supporting-arms for giving the screen a longitudinal shaking movement, substantially as described.

WILLIAM REUTHER.
JOHN REUTHER.

Witnesses:
JAMES SANGSTER,
ARTHUR J. SANGSTER.